United States Patent
Kösling et al.

(10) Patent No.: US 6,856,881 B2
(45) Date of Patent: Feb. 15, 2005

(54) ADAPTATION METHOD FOR CONTROLLING SHIFTING ELEMENTS

(75) Inventors: Wolfgang Kösling, Langenargen (DE); Klaus Steinhauser, Kressbronn (DE)

(73) Assignee: ZF Friedrichshafen AG (DE)

( * ) Notice: Subject to any disclaimer, the term of this patent is extended or adjusted under 35 U.S.C. 154(b) by 63 days.

(21) Appl. No.: 10/212,855

(22) Filed: Aug. 5, 2002

(65) Prior Publication Data

US 2003/0050750 A1 Mar. 13, 2003

(30) Foreign Application Priority Data

Aug. 3, 2001 (DE) .......................................... 101 38 240

(51) Int. Cl.$^7$ ................................................ G06F 7/00
(52) U.S. Cl. ....................................................... 701/58
(58) Field of Search ............................. 701/51, 52, 56, 701/58; 477/34

(56) References Cited

U.S. PATENT DOCUMENTS 6,170,623 B1 * 1/2001 Eismann et al. ........... 192/3.55
6,374,170 B1 * 4/2002 Kresse et al. ................. 701/51

* cited by examiner

Primary Examiner—Yonel Beaulieu
(74) Attorney, Agent, or Firm—Milde & Hoffberg LLP

(57) ABSTRACT

A system and method for correcting a control of relevant parameters of operation of an automatic transmission having shift elements of a hydraulically-shifted automotive automatic transmission. The influences of an alteration of the internal adaptation parameters on stored external adaptation parameters are taken into account, thus creating a quick-acting and robust adaptation system. The control algorithm is sensitive to a level of the stored external adaptation parameters, to compensate for internal parameter interactivity without requiring comprehensive evaluation of the interaction under all circumstances.

33 Claims, 2 Drawing Sheets

ADAPTATION METHOD FOR CONTROLLING SHIFTING ELEMENTS

FIELD OF THE INVENTION

The present invention relates to the field of systems and methods for the control of shifting elements in a vehicular automatic transmission, having hydraulic shift elements.

BACKGROUND OF THE INVENTION

It is known that the demands of customers regarding the shifting comfort of automatic transmissions is constantly increasing. However, transmission manufacturers and their suppliers can only manufacture transmission parts to certain tolerances because of cost and production reasons. Therefore, it is typical to implement corrections to shifting, or to individual phases of shifting, via an electronic transmission control in order to ensure a high level of shifting quality for the entire life of the transmission, regardless of wear, degradation, and changing environmental conditions. These corrections (adaptations) take undesired alterations to the shifting progression into account that occur, for example, because of component tolerances, changes in lamella friction values, and mechanical wear within the automatic transmission. Parameters controlling these adaptations are usually stored in a transmission-control adaptation buffer, and form so-called adaptation characteristic mapping.

These mappings generally include two different axes, according to which the characteristic mapping parameters are divided into two classes. It is usual for the system to alter these mappings to "learn" from external events. This means that the mapping is empty (or at a base state) when operation begins. For each occurring event that may be assigned to a class, it is determined via external sensors whether the event occurred in the desired manner, or whether it occurred in a manner worse than expected. Depending on the event, each class of characteristic mapping is moved one adaptation step upward, one adaptation step downward, or not moved at all.

To date, the art has sought to achieve the most accurate results possible, typically using a large number of adaptations. However, the fact that a connection may exist between various adaptations has not been taken into account, but rather several adaptations were performed simultaneously without taking potential connections into account.

SUMMARY OF THE INVENTION

The task on which the present invention is based consists of creating an adaptation system and employing a method of adaptation in which adaptations to specified parameters are taken into account by other adaptations, in order to enable a quick-reacting, robust adaptation system.

The task is solved in that an evaluation of the various adaptations is performed by the invention, and the mutual interaction of external and internal adaptations are taken into account during the correction of external parameters. Thus, prior to use of an updated parameter mapping, a multivariate analysis is performed, rather than treating each parameter as an orthogonal variable.

The concepts 'internal' and 'external' will be used for the sake of clarity. According to the invention, certain parameters are reviewed after the adaptation as to whether additional parameters exist on which the so-called internal parameters have influence. If these internal parameters are adapted, then the alterations of the internal adaptations are taken into account during the adaptation of external parameters. The degree of influence of internal adaptations on the external parameters depends on the so-called evaluation level of the external adaptation. This evaluation level may be determined using various criteria. For example, the number of shifts, the number of evaluations already performed, or the number of recently-determined step values of an adaptation already performed, may be used.

Depending on the evaluation level of external adaptations, the determined result of internal adaptation is weighted, and is taken correspondingly into account during external adaptations. Thus, the values of a corresponding operating point, an entire range, or an entire adaptation mapping are corrected advantageously. Since the algorithm is sensitive to the level of the particular parameter, it is possible to avoid unnecessary calculations while producing a near optimal result.

Taking into account the evaluation level of external adaptations is important, since in the case of a very low evaluation, the result of the internal adaptation should not be used strongly in the external adaptation for the purpose of correction. As long as the evaluation level of the external adaptation is low, no modification of the necessary adaptation direction or level may be necessary. Therefore, it is possible to avoid the undesired result that the adaptation goal of low-evaluated external adaptations is unnecessarily delayed by a too significant evaluation of the internal adaptation. Thus, where it is anticipated that, based on the actual operating state, the multivariate analysis of internal parameters will have an insignificant effect on the adaptation, it may be ignored or discounted.

If, however, a high evaluation level of the external adaptation is achieved, then the value of the internal adaptation should be taken more strongly into account. If this does not occur, an overcompensation of the influences to be adapted would result during subsequent shifts by means of the interaction of these two, or three (or more), adaptations. Thus, if it is anticipated that, based on the actual operating state, the multivariate analysis will prove significant, the analysis may be completed, or perhaps performed to a higher degree.

It is therefore an object of the invention to provide a method for adapting parameters of an electronic transmission control for controlling an automatic transmission, wherein a set of external adaptation parameters are stored in a memory, comprising evaluating the value of a stored external adaptation parameter with respect to an evaluation level to determine a weighting to be applied to a calculation involving an internal adaptation parameter, and calculating a modified set of external adaptation parameters in dependence thereon. The calculation may be controlled in various ways. For example, the weighting may comprise a decision to include or exclude an internal adaptation parameter in a calculation; a decision to include or exclude a term in a calculation, or may alter a computational complexity of implementing a modified set of external adaptation parameters.

Typically a weighting of an internal adaptation parameter increases with increasing value of a corresponding stored external adaptation parameter, and thus at low values, where a response may be relatively linear, less correction is applied than at higher values, where an exponential response may be apparent. Thus, the set of external adaptation parameters is related to a modified set of external adaptation parameters by at least one mathematic function. This mathematic function may, under various circumstances, be a linear function, or an exponential function, or another function. According to a preferred embodiment, the at least one mathematic function comprises a linear function when the value of the set of external adaptation parameters has a first predetermined relation with respect to the evaluation level and the at least one mathematic function comprises an exponential function when the value of the set of external adaptation parameters has a second predetermined relation with respect to the evaluation level.

According to another aspect of the invention, the internal adaptation parameter is determined in dependence on at least one sensor input into the electronic transmission control. Typically, there are a plurality of sensor inputs received into the electronic transmission control, and a plurality of internal adaptation parameters are determined in dependence thereon, wherein an algorithm is employed for determining an optimum modified set of external adaptation parameters which comprises evaluation of interdependencies between said plurality of internal adaptation parameters to a first degree under first predetermined circumstances and to a second degree under second predetermined circumstances, the first and second predetermined circumstances being distinct, further comprising the steps of determining the existence of the first and second predetermined circumstances, and determining an optimum modified set of external adaptation parameters using the algorithm based on the determined circumstances.

The set of external adaptation parameters may comprise a single set of parameters applied under all circumstances, or a plurality of sets of parameters, selectively applied based on determined circumstances. The set of modified external adaptation parameters may be limited to the selectively applied set, or all sets may be modified as appropriate.

The set of internal adaptation parameters may be unprocessed input sensor signals, calculated derivative thereof, or analyzed and/or processed representations thereof. Likewise, the internal adaptation parameters may be temporally-based signals such as a rate, duration or more complex time-based parameter, or representations thereof, rather than signals representing a magnitude of a physical parameter.

According to another object of the invention, in a calculation to produce the modified set of external adaptation parameters, a greater weight is applied to a correction based on the internal adaptation parameter when the evaluation level of a corresponding value of said set of external adaptation parameters is high, and a lower weight is applied to a correction based on the internal adaptation parameter when the evaluation level of a corresponding value of said set of external adaptation parameters is low.

Advantageously, the set of modified external adaptation parameters is stored, to become the set of external adaptation parameters for a subsequent adaptive control usage.

It is a further object of the invention to provide an control for adaptively controlling parameters of an automatic transmission, comprising a memory for storing values of a set of external adaptation parameters, a processor for evaluating the value of the set of external adaptation parameters with respect to an evaluation level to determine, a weighting to be applied to a calculation involving at least one internal adaptation parameter, for determining a modified set of external adaptation parameters, and an output, for controlling the automatic transmission in dependence on the modified set of external adaptation parameters. The control may be used in combination with an automatic transmission, and the control and transmission may be used in combination with a vehicle. The transmission control may be integrated with other vehicular electronics systems, and, for example, may employ sensors shared by other vehicle systems, and produce outputs used by other vehicular systems, besides the transmission. For example, traction control, antilock braking, cruise control, stability control, telematics (external communications, Internet, location-based control), and the like, may all be interconnected. Likewise, the system and method according to the present invention may be employed to control other systems, such as those enumerated above.

Typically, the control receives sensor data which relates to parameters of automatic transmission operation that cannot be accurately predicted absent a sensor measurement thereof, or for which a sensor measurement is more efficient that an accurate prediction. The sensor data preferably represents a parameter dependent on at least one of wear, environmental conditions, and usage conditions.

It is also an object of the present invention to provide a computer readable storage medium, storing thereon instructions for controlling a processor to perform the method according to the present invention. This medium may be, for example, a read only memory (ROM), electrically erasable programmable read only memory (EEPROM), magnetic storage, optical disk, or the like. The control typically consists of an embedded microprocessor in an electronics module mated to the transmission, executing a real-time program for controlling the transmission. The adaptation parameters are typically stored in EEPROM memory, which may be the same or different from the memory storing the program code.

These and other objects and features of the present invention will become more fully apparent from the following description and appended claims taken in conjunction with the accompanying drawings.

BRIEF DESCRIPTION OF THE PREFERRED EMBODIMENTS

Advantageous embodiments of the invention may be derived from the illustrations, in which.

DETAILED DESCRIPTION OF THE PREFERRED EMBODIMENTS

As used herein, the following definitions shall apply:

| | |
|---|---|
| a_internal | value of internal adaptation |
| Δa_internal | Alteration of adaptation of internal parameter |
| a_external_new | New (modified) value of relevant external adaptation |
| a_external_old | Old value of relevant external adaptation |

Figure 1:
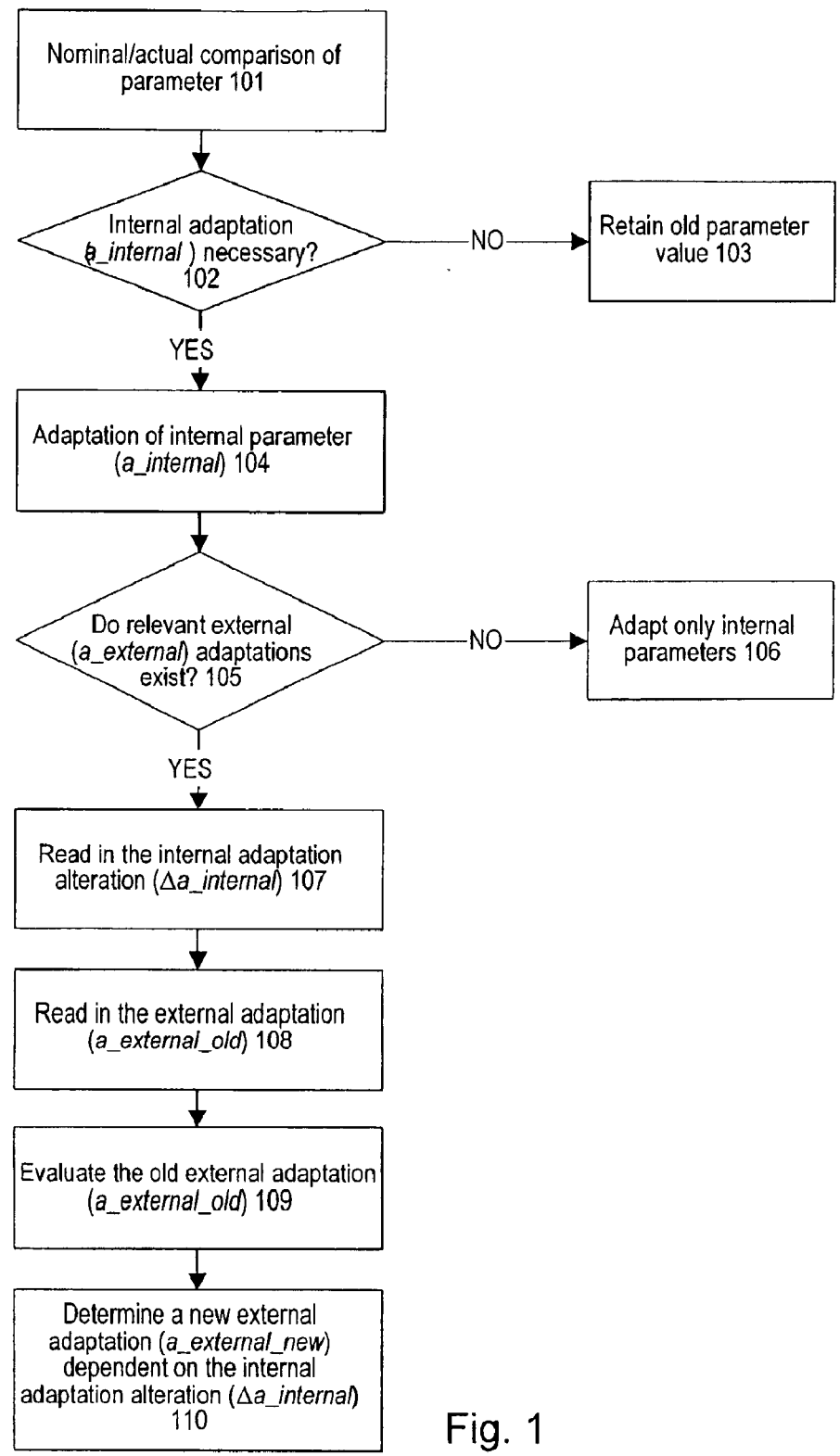
FIG. 1 shows a flow chart of the adaptation procedure based on the invention.

FIG. 1 shows a flow chart of a method according to the present invention. First, the available value of the internal parameter is compared with its nominal value 101. If a difference exists between the two values 102, an adaptation of this parameter is required. If the values are identical, then the old value of the parameter is used 103. If an adaptation of the internal parameter is required 104, it is first reviewed whether adaptations to the external parameter exist that are influenced by internal adaptation alteration Δa_internal. If no relevant external parameters exist 105, then only the internal parameter is adapted 106. But when there are external adaptations on which the internal adaptation alteration Δa_internal has influence 107, they are taken into account. For this reason, the value of the internal adaptation a_internal is read in 104, then the alteration of the internal adaptation Δa_internal 107 as well as the values of the existing external adaptations a_external_old are read 108. Thereafter, the old external adaptations a_external-old must be evaluated 109. Dependent on the level of the resulting evaluation level B, the internal adaptation Δa_internal is properly considered for the new external adaptations a_external_new 110. If the evaluation level B of the old foreign adaptation a_external_old is high, then the internal adaptation alteration Δa_internal is given less weight.

Figure 2:
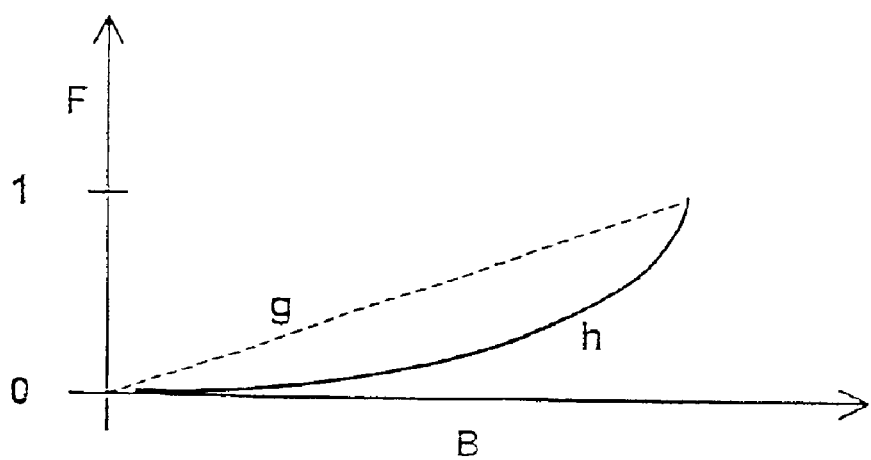
FIG. 2 shows a diagram to determine a factor dependent on the evaluation level.

FIG. 2 shows two sample graphs g (linear function), h (exponential function) used to determine the factor F that represents the evaluation level B (Evaluation level of the old internal adaptation) of the factor F (Factor for weighting the evaluation level) of the old external adaptation a_external_old in Formula 1.

$$a\_external\_new = a\_external\_old - F^* \Delta a\_internal \quad (1)$$

As may be seen from FIG. 2, the factor F remains low as long as the evaluation level B of the old external adaptation a_external_new is low. For increasing evaluation level B, the value of the factor F also increases, in this case in an exponential fashion. The value of the factor F lies between zero and one, whereby the increase is at least partially linear or exponential. Other progressions are also possible.

Thus, according to the present invention, the operating space of the factor F is segregated between zones in which a linear approximation is acceptable, for example having an approximately linear response ($|y-(ax+b)| < \epsilon$) and zones in which higher order processing of data is required in order to achieve a desired degree of accuracy, for example using a higher order relationship ($|y-(\Sigma(a_i x^i)-b)| < \epsilon < |y-(ax+b)|$), wherein $\epsilon$ represents a permissible error. Thus segmentation of the operating space, in turn, allows a simplification or optimization of the algorithm implemented at each operating point, thus providing a desired degree of accuracy while reducing the degree of processing necessary. It is understood that there is no particular limit on the number or boundary types of the segmentation, which may represent regions within a multivariate space. Further, it is understood that the relationships need not be represented or representable as polynomials or approximated as such. Further, the basis for determining a particular operating regime need not be a simple sensor level, and may therefore be based on derivatives and processed data. Likewise, under circumstances where the load demand on the adaptation processor exceeds its real time processing capabilities, a simplified calculation may be executed, optionally with optimal calculations performed when capabilities exist. According to known systems without such segmentation of the operating space, a simplification of the overall algorithm would result in overcorrection or undercorrection in various circumstances, and requires full processing of parameters under all circumstances.

Likewise, using an adaptation algorithm of similar computational complexity, the system and method according to the present invention can achieve a better result, since the interaction of various parameters may then be considered.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. A method for adapting parameters of an electronic transmission control for controlling an automatic transmission, wherein a set of external adaptation parameters are stored in a memory, comprising evaluating the value of a stored external adaptation parameter with respect to an evaluation level to determine a weighting to be applied to a calculation involving an internal adaptation parameter, calculating a modified set of external adaptation parameters in dependence thereon, and producing an output for controlling an automatic transmission in dependence on an algorithm together employing the modified set of external adaptation parameters, said modified set of parameters comprising at least two parameters.

2. The method according to claim 1, wherein said weighting comprises a decision to include or exclude an internal adaptation parameter in a calculation.

3. The method according to claim 1, wherein said weighting comprises a decision to include or exclude a term in a calculation.

4. The method according to claim 1, wherein said weighting is applied to alter a computational complexity of implementing a modified set of external adaptation parameters.

5. The method according to claim 1, wherein a weighting of an internal adaptation parameter increases with increasing value of a corresponding stored external adaptation parameter.

6. The method according to claim 1, further comprising the step of receiving at least one sensor input into the electronic transmission control, and determining an internal adaptation parameter in dependence thereon.

7. The method according to claim 1, further comprising the step of receiving a plurality of sensor inputs into the electronic transmission control, and determining a plurality of internal adaptation parameters in dependence thereon, wherein an algorithm is employed for determining an optimum modified set of external adaptation parameters which comprises evaluation of interdependencies between said plurality of internal adaptation parameters to a first degree under first predetermined circumstances and to a second degree under second predetermined circumstances, the first and second predetermined circumstances being distinct, further comprising the steps of determining the existence of the first and second predetermined circumstances, and determining an optimum modified set of external adaptation parameters using the algorithm based on the determined circumstances.

8. The method according to claim 1, wherein said stored set of external adaptation parameters comprise a single set of parameters applied under all circumstances.

9. The method according to claim 1, wherein said stored set of external adaptation parameters comprises a plurality of sets of parameters, selectively applied based on determined circumstances.

10. The method according to claim 1, further comprising the steps of receiving a sensor reading and calculating a derivative of said sensor reading as said internal adaptation parameter.

11. The method according to claim 1, further comprising the steps of receiving a sensor reading and analyzing said sensor reading to calculate said internal adaptation parameter.

12. The method according to claim 1, wherein in a calculation to produce the modified set of external adaptation parameters, a greater weight is applied to a correction based on the internal adaptation parameter when the evaluation level of a corresponding value of said set of external adaptation parameters is high, and a lower weight is applied to a correction based on the internal adaptation parameter when the evaluation level of a corresponding value of said set of external adaptation parameters is low.

13. The method according to claim 1, wherein the set of external adaptation parameters is related to a modified set of external adaptation parameters by at least one mathematic function.

14. The method according to claim 13, wherein the at least one mathematic function comprises a linear function when the value of the set of external adaptation parameters has a predetermined relation with respect to the evaluation level.

15. The method according to claim 13, wherein the at least one mathematic function comprises an exponential function when the value of the set of external adaptation parameters has a predetermined relation with respect to the evaluation level.

16. The method according to claim 13, wherein the at least one mathematic function comprises a linear function when the value of the set of external adaptation parameters has a first predetermined relation with respect to the evaluation level and the at least one mathematic function comprises an exponential function when the value of the set of external adaptation parameters has a second predetermined relation with respect to the evaluation level.

17. The method according to claim 1, further comprising the step of storing the set of modified external adaptation parameters to become the set of external adaptation parameters.

18. An control for adaptively controlling parameters of an automatic transmission, comprising a memory for storing values of a set of external adaptation parameters, a processor for evaluating the value of the set of external adaptation parameters with respect to an evaluation level to determine, a weighting to be applied to a calculation involving at least one internal adaptation parameter, for determining a modified set of external adaptation parameters, and an output, for controlling the automatic transmission in dependence on the modified set of external adaptation parameters.

19. The control according to claim 18 in combination with an automatic transmission.

20. The control according to claim 18 in combination with a vehicle having a transmission adaptively controlled thereby.

21. The control according to claim 18, further comprising an input for receiving sensor data.

22. The control according to claim 21, wherein said sensor data relates to parameters of automatic transmission operation which cannot be accurately predicted absent a sensor measurement thereof.

23. The control according to claim 21, wherein the sensor data reads a parameter dependent on at least one of wear, environmental conditions, and usage conditions.

24. A computer readable storage medium, storing thereon instructions for controlling a processor to perform the method according to claim 1.

25. An adaptive control for an automatic transmission, comprising:
a memory storing a set of external adaptation parameters;
a processor for producing an output for controlling the automatic transmission, said output being produced based on an algorithm in dependence on a multivariate analysis involving the stored external adaptation parameters, weightings derived from a respective level of a stored external adaptation parameter, and an internal adaptation parameter.

26. The adaptive control according to claim 25, wherein the weighting for an internal adaptation parameter is bivalued.

27. The adaptive control according to claim 25, wherein said adaptive control further comprises an input receiving information relating to an operation of the automatic transmission, the input information being operated upon in the multivariate analysis.

28. A method for adapting parameters of an electronic transmission control for controlling an automatic transmission, wherein a set of external adaptation parameters are stored in a memory, comprising evaluating the value of a stored external adaptation parameter with respect to an evaluation level to determine a weighting to be applied to a calculation involving an internal adaptation parameter, calculating a modified set of external adaptation parameters in dependence thereon, and producing an output for controlling an automatic transmission in dependence on the modified set of external adaptation parameters, said modified set of parameters comprising at least two parameters, wherein said weighting comprises a decision to include or exclude a term in a calculation.

29. The method according to claim 28, wherein the included or excluded term comprises an internal adaptation parameter.

30. A control for adaptively controlling parameters of operation for an automatic transmission, comprising a memory for storing values of a set of external adaptation parameters, a processor for evaluating the value of the set of external adaptation parameters with respect to an evaluation level to determine a weighting to be applied to a calculation involving at least one internal adaptation parameter, for determining a modified set of external adaptation parameters, and an output, for controlling the automatic transmission in dependence on a plurality of parameters from the modified set of external adaptation parameters, wherein said weighting comprises a decision to include or exclude a term in a calculation.

31. The control according to claim 30, wherein the included or excluded term comprises an internal adaptation parameter.

32. An adaptive control for an automatic transmission, comprising:
a memory storing a set of external adaptation parameters;
a processor for producing an output for controlling the automatic transmission, said output being produced based on an algorithm in dependence on a multivariate analysis involving the stored external adaptation parameters, weightings derived from a respective level of a stored external adaptation parameter, and an internal adaptation parameter, wherein said processor makes a decision to include or exclude a term in a calculation.

33. The adaptive control according to claim 32, wherein the included or excluded term comprises an internal adaptation parameter.

* * * * *